United States Patent [19]

Vess et al.

[11] Patent Number: 4,739,957
[45] Date of Patent: Apr. 26, 1988

[54] STRAKE FENCE FLAP

[75] Inventors: Robert J. Vess, Raleigh, N.C.; Dhanvada Rao, Hampton, Va.

[73] Assignee: Advanced Aerodynamic Concepts, Inc., Raleigh, N.C.

[21] Appl. No.: 860,841

[22] Filed: May 8, 1986

[51] Int. Cl.$^4$ .............................................. B64C 23/06
[52] U.S. Cl. ..................................... 244/199; 244/213; 244/91
[58] Field of Search ............. 244/199, 213, 215, 45 R, 244/45 A, 91

[56] References Cited

U.S. PATENT DOCUMENTS

| | | | |
|---|---|---|---|
| D. 266,161 | 9/1982 | Rosenthal | 244/45 A |
| 2,650,752 | 9/1953 | Hoadley | 244/199 |
| 3,471,107 | 10/1969 | Ornberg | 244/199 |
| 3,744,745 | 7/1973 | Kerker | 244/199 |
| 4,466,586 | 8/1984 | Burnham | 244/213 |

FOREIGN PATENT DOCUMENTS

| | | | |
|---|---|---|---|
| 1809593 | 9/1970 | Fed. Rep. of Germany | 244/199 |
| 160134 | 8/1957 | Sweden | 244/199 |

Primary Examiner—Galen Barefoot
Attorney, Agent, or Firm—Lynn E. Barber; Paul Overhauser

[57] ABSTRACT

The strake fence flap is a device which may be tailored to the aircraft to augment the low-speed lift of canard-configured general aviation aircraft with little or no longitudinal trim change and no cruise drag penalty. The strake fence flap is deployed along the upper surface of each of the strakes on the canard aircraft. The strake fence flap is hinged along its lower edge which allows it to be retracted and extended as needed. In the cruise configuration, the strake fence flap is folded flush with the strake upper surface. For deceleration or landing where increased lift and drag are required, the strake fence flap is extended. The frontal area of the strake fence flap becomes exposed resulting in additional drag. The geometry and positioning of the fence causes the flow to separate from the upper edge of the fence and to roll up into a vortex which trails over the strake. The intense suction which accompanies the vortex acts directly on the strake upper surface, thereby significantly increasing the lift.

17 Claims, 4 Drawing Sheets

STRAKE FENCE FLAP

FIELD OF THE INVENTION

This invention relates to aircraft lift-enhancing mechanisms. In particular, the present invention relates to a device for augmenting the lift on the upper strake surface of canard-type aircraft by vortex generation from retractable flaps placed behind the leading edge and on the upper surface of the strakes.

BACKGROUND INFORMATION

In order for a pilot to effectively control an aircraft in all regimes of flight, he must be able to vary the forces acting on it. This is accomplished by deflecting various flaps on the flying surfaces of the aircraft which produce changes in the pressure forces acting on those surfaces. The configuration of an aircraft and its mission determine the shape, size, and placement of the flaps.

While certain types of flaps are used to provide rolling, pitching, and yawing moments which allow changes in the flight path, other types are used to enhance the low speed lift and drag which determine the landing performance of the aircraft. In common use are flaps which are hinged about the trailing edge of the wing which, when deflected downward, increase the camber or a combination of camber and wing area resulting in increased lift and drag. Similarly, there are flaps which pivot about the leading edge of the wing and increase the camber when deflected downward. Both of these devices allow an aircraft to decelerate quickly, approach an airport at a steep descent angle, and land slowly.

Canard Aircraft

There are some advanced aircraft configurations which cannot utilize conventional landing flaps due to the placement of their wing and tail surfaces. When landing, these aircraft are thus forced to make shallower angle approaches that those utilized by conventional aircraft. Of primary concern here is a so-called "canard" aircraft. Such an aircraft is generally characterized by a smaller forward wing known as a canard which is placed ahead of the main wing instead of behind it as is of normal practice. Since this forward wing generates a significant amount of the total aircraft lift, the resultant of the total lift force (neutral point) acts somewhere between the fore and aft wings. In order to have a longitudinally stable aircraft, the center of gravity (c.g.) must be placed ahead of this neutral point. Therefore, a change in the lift of either surface produces a pitching moment about the center of gravity. This means that if trailing edge flaps are used on the rear wing, they must also be placed on the forward wing and deflected in such a manner to cancel the pitching moment produced by any rear wing flap deflection. In practice, the rear wing generates much more of the total aircraft lift than the canard due to its usually larger area. Therefore, the pitching moment produced by any flap deflection on the rear wing requires a substantial trimming force from the canard which is usually not available. It is for this reason that canard aircraft generally do not use high lift flaps on the rear wing and, consequently, suffer in the low speed regimes of flight.

Use of Strakes on Canard Aircraft

Virtually every existing canard aircraft utilizes "strakes" to distribute fuel and baggage at the center of gravity to maintain longitudinal trim. An aircraft wing has a strake if its leading edge extends forward toward the fuselage, at an angle steeper than the rest of the leading edge. (See FIG. 5.) The strake includes the portion of the wing from the fuselage to the point on the leading edge of the wing where the leading edge begins to extend forward toward the fuselage, and backward to the trailing edge of the wing. For canard aircraft, a strake typically constitutes $\frac{1}{4}$ to $\frac{1}{3}$ of the wing span. Since strakes usually contain the majority of the fuel load of the aircraft, the strakes represent a substantial part of the total area of the rear wings. However, these strakes are not very efficient in producing lift since their large average chord would result in excessive thickness if a normal cambered airfoil section was used. Therefore, a relatively flat airfoil section with resultant low lift is usually used in the strake region.

The fact that the strake represents a substantial planform area near the aircraft center of gravity which does not generate a corresponding amount of lift is considered a compromise in the low-speed performance of otherwise cruise-efficient canard aircraft. However, these features lend themselves well to other lift enhancement techniques, particularly if the resultant of the augmented lift can be contained in the region of the strake upper surface that is close to the aircraft center of gravity. This can be achieved by the generation of vortices on the strake upper surface which is the basis of the design of the device disclosed herein.

Flaps for Vortex Generation

Devices which generate or manipulate vortical flow are known to the prior art. The invention of Rao (U.S. Pat. No. 4,485,992) discloses a flap which is hinged about the leading edges of a highly swept wing which shifts the center of lift on one wing panel to produce a rolling moment away from the deployed flap. This device is designed strictly as a roll control device which redistributes the lift generated by the existing leading edge vortices which are characteristic of all thin, highly-swept wings at high angles of attack.

Kasper (U.S. Pat. No. 3,831,885) presents a device which is intended to augment lift on low-speed tail-less airplanes such as the one described in U.S. Pat. No. 3,438,597. This device is actually a system of flaps which work in conjunction to generate and stabilize transverse spanwise vortices over the entire upper surface of the wing. Thus, the flaps create an effectively larger wing profile as sensed by the passing airflows and create sustaining aerodynamic lift forces in excess of those which would be created by the cruising airfoil contour beyond stall angles of attack. The object of this invention is to create the spanwise vortices at an angle of attack below that at which they would occur naturally on this particular type of wing.

SUMMARY OF THE INVENTION

The strake fence flap of this invention is a device which may be tailored to augment the low-speed lift of canard-configured general aviation aircraft with minimal longitudinal trim change and no cruise drag penalty. The strake fence flap is deployed along the upper surface (as opposed to the leading edge) of each of the strakes on the canard aircraft. The strake fence flap is hinged along its lower (front) edge which allows it to be extended and retracted as needed. The mechanism for extension and retraction is well-known in the art of aircraft flaps and is not part of the invention. In the cruise configuration, the strake fence flap is folded flush with the strake upper surface. The airflow over the strake is not disturbed by the presence of the retracted fence and the wetted area of the aircraft is not altered since the strake fence flap occupies existing surface area of the strake. The result is no net drag rise due to the strake fence flap in this position.

In the deceleration or landing mode, where additional lift and drag are required, the strake fence flap is extended. Preferably, strake fence flaps on both strakes will be extended an equal amount at the same time. The frontal area of the strake fence flap is projected into the airflow above the strake resulting in additional drag. The geometry and positioning of the strake fence flap causes the flow to seperate from its upper edge and roll up into a vortex which trails longitudinally over the strake. Due to the usually large leading edge radius and thickness of the strake, a leading edge vortex does not form naturally at a moderate angle of attack as it would on a thin wing with the same leading edge sweep. Therefore, the maximum lift attainable on the strake is solely dependent on the aforementioned airfoil shape and the extent of attached flow if the strake fence flap is not deployed. However, when a vortex is created due to an extension of the strake fence flap, the intense suction which accompanies the vortex acts directly on the strake upper surface, thereby significantly increasing the lift.

The strake fence flap may be positioned on the strake so that the resultant of the vortex lift acts at, or close to, the aircraft center of gravity, thus minimizing or totally eliminating any longitudinal pitching moment while greatly enhancing the overall lift of the aircraft. Similarly, the strake fence flap may be positioned to control the trajectory of the vortex to avoid potential problems such as propeller vibration due to vortex impingement on its blades.

The size and geometry of the strake fence flap is determined for a particular aircraft such that it produces a strong, stable vortex which trails close to the surface of the strake and persists past the trailing edge without breakdown. Optimization of this geometry must also include consideration of the frontal area requirements for the desired drag increment and any other constraints which are dictated by the aircraft on which it will be used. These will usually result in a strake fence flap with a surface area which will be between 10 to 30 percent of the surface area of the strake to which it is affixed. The preferred angular orientation of the strake fence flap (as defined by the angle between a line perpendicular to the longitudinal axis of the aircraft and the lower hinged edge of the flap) will be between 60 and 80 degrees in either a clockwise or counterclockwise direction. However, tests have indicated that the vortex generated by the flap acts on a greater area of the strake when the flap is pointed toward the fuselage, as shown in the drawings (i.e. the angular orientation is between 60 and 80 degrees of a counterclockwise rotation for the left strake, and a clockwise rotation for the right strake.

OBJECTS OF THE INVENTION

One object of the invention is to increase the maximum lift attainable of a canard-configured aircraft.

Another object of the invention is to design a strake fence flap system which may be so positioned as to allow the resultant of the created vortex lift to occur at or near the aircraft center of gravity and thus to minimize or eliminate any change in the longitudinal pitching moment of the aircraft while greatly enhancing the lift.

Another object of the invention is to provide a device to produce drag for deceleration of a canard-configured aircraft.

Another object of the invention is to design a strake fence flap which does not require mounting on the leading edge of a strake, but may be mounted on the upper surface of a strake.

Another object of the invention is to design a strake fence flap that may be hinged about its lower edge.

Another object of the invention is to design a strake fence flap which is both extendable and retractable.

Another object of the invention is to design a strake fence flap which is flush with the aircraft exterior when retracted so as to produce no additional drag.

Another object of the invention is to design a flap system with adaptability to the aerodynamic requirements and constraints of a particular aircraft.

Still other objects and advantages of the invention will become apparent to those of skill in the art after reading the following the description of the preferred embodiments.

DESCRIPTION OF THE PREFERRED EMBODIMENTS

Figure 1:
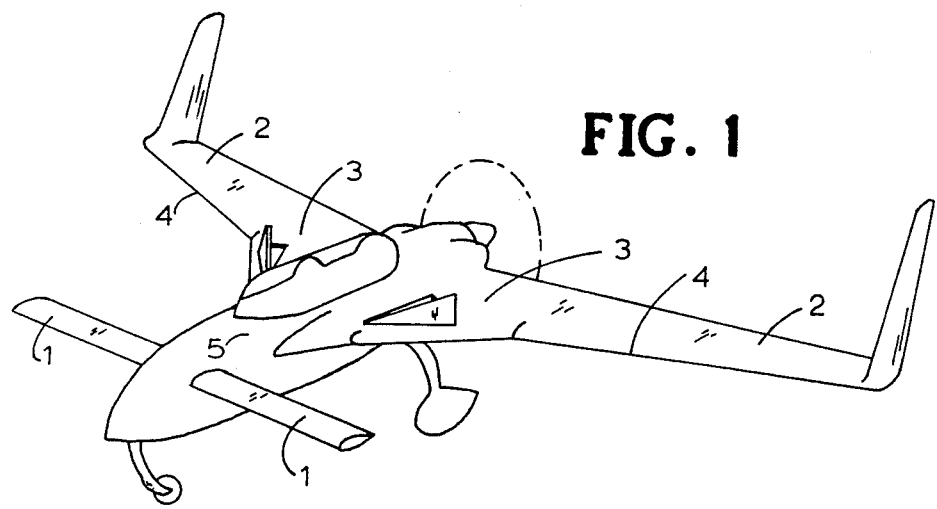
FIG. 1 is a perspective view of a typical canard-type aircraft with delta-shaped strake fence flaps in the deployed position.

FIG. 1 is a perspective view of a typical canard-type aircraft with strake fence flaps deployed on the upper surface of the strakes. The aircraft includes a forward wing or canard 1, and rear wings 2. Each rear wing also includes a strake region 3, which is the region where the angle of the leading edge 4 projects forward (changes sweep) as it nears the fuselage 5. The area of the strakes is carefully distributed about the center of gravity of the aircraft so that when they are loaded internally with varying amounts of fuel or baggage, the center of gravity is not shifted significantly.

Figure 2:
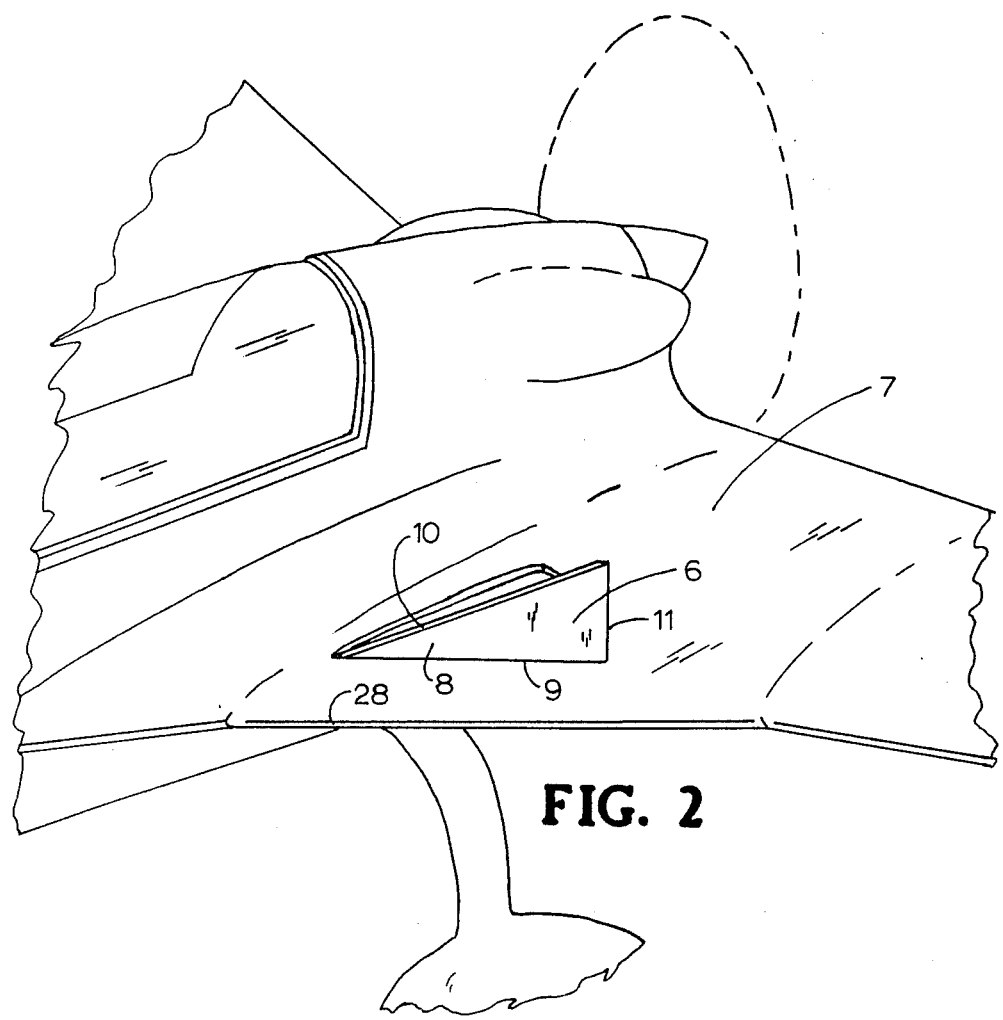
FIG. 2 is a perspective view of the strake fence flap in the deployed position.

FIG. 2 is a closeup view of the left strake as illustrated in FIG. 1. The strake fence flap 6 is extended above the upper surface 7 and behind the leading edge 28 of the strake. The flap is depicted with a representative triangular shape having a front face 8, a lower hinged edge 9, a free upper edge 10, and a rear edge 11. In this extended position of the flap, the upper edge 10 and the rear edge 11 project upward from the strake surface, while the front face 8 becomes exposed to the oncoming airflow.

Figure 3:
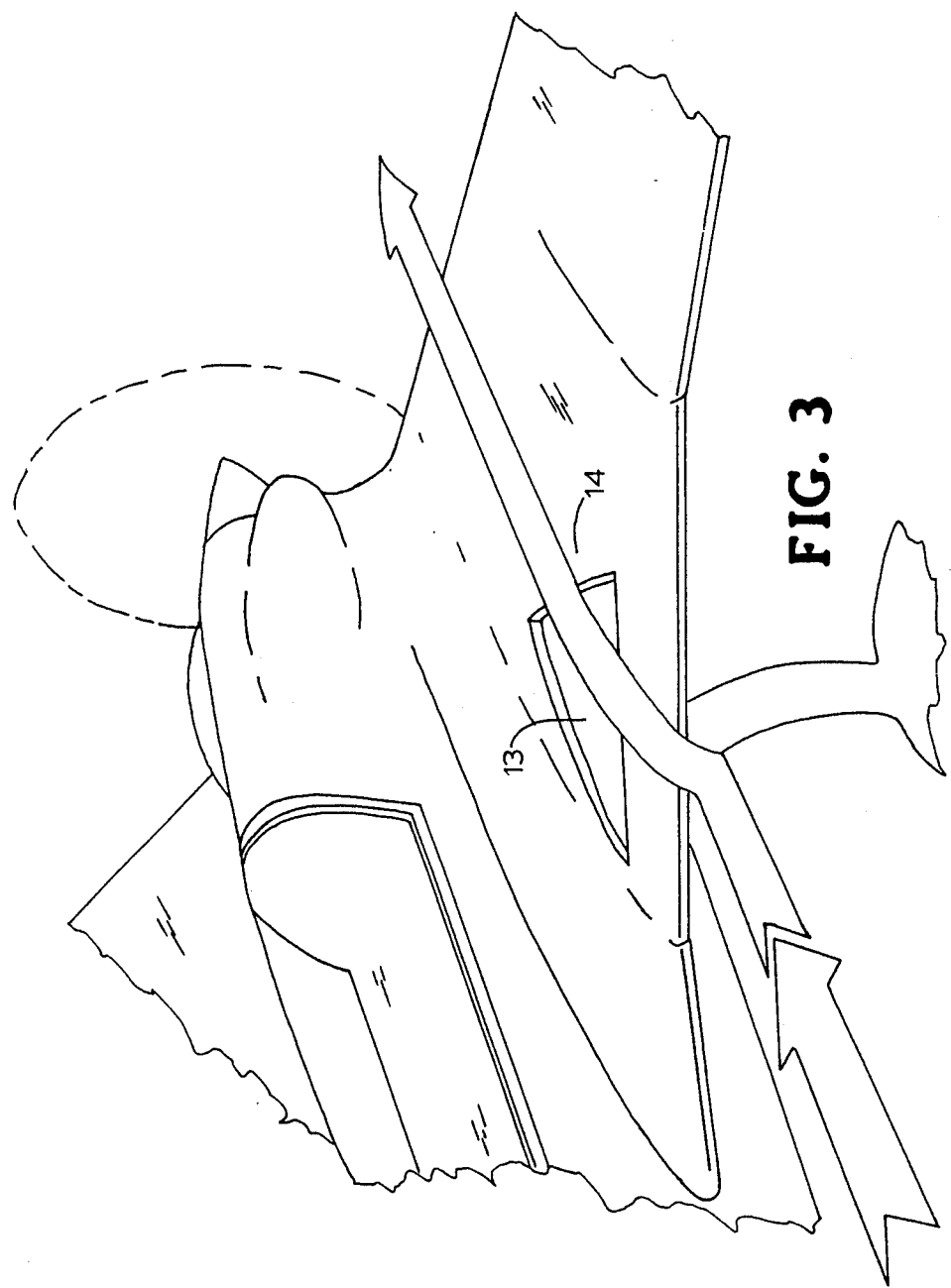
FIG. 3 is a perspective view of the strake fence flap in the retracted position and the associated airflow.

FIG. 3 is a perspective view of the left strake region showing the strake fence flap in the retracted or cruise position. The air flow over the wing is indicated by the arrow over the wing. The front face of the flap 13 is flush with strake 14, allowing the airflow to pass undisturbed. Since the flap in this position occupies existing wetted area of the strake, no drag penalty is realized.

Figure 4:
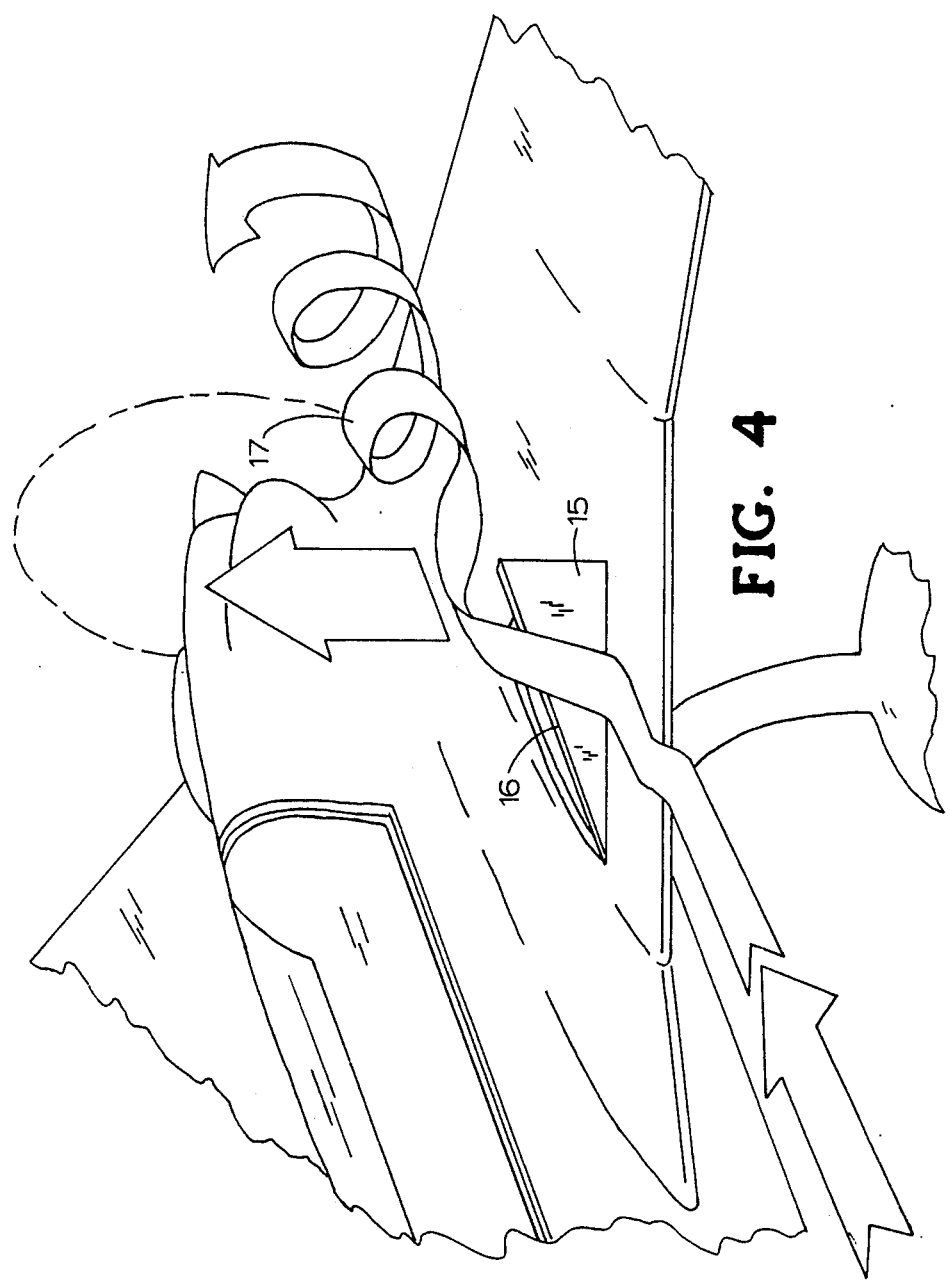
FIG. 4 is a perspective view of the deployed position of the strake fence flap and the associated vortex generation, which is representative of a deceleration or landing mode.

FIG. 4 is a perspective view of the extended position of the strake fence flap which is representative of a deceleration or landing mode. The air flow over the wing is indicated by the arrow over the wing. Since the flap is situated at an effective angle of attack with respect to the free stream flow direction, the front face 15 provides projected frontal area and, hence, produces the drag required for quick deceleration. As the flow impinges on the flap, it shears toward and separates from the unattached edge 16. The formation of a strong, stable vortex 17 results and trails back longitudinally over the upper surface of the strake. The intense suction which accompanies the vortex therefore acts upon the strake, producing a net augmentation in the lift as shown by the upward arrow. The combination of the increased lift and drag produced by the deflection of the strake fence flap allows the canard aircraft to assume a slower, steeper descent to landing which has not been demonstrated without major complications with conventional flap systems common to the prior art.

Figure 5:
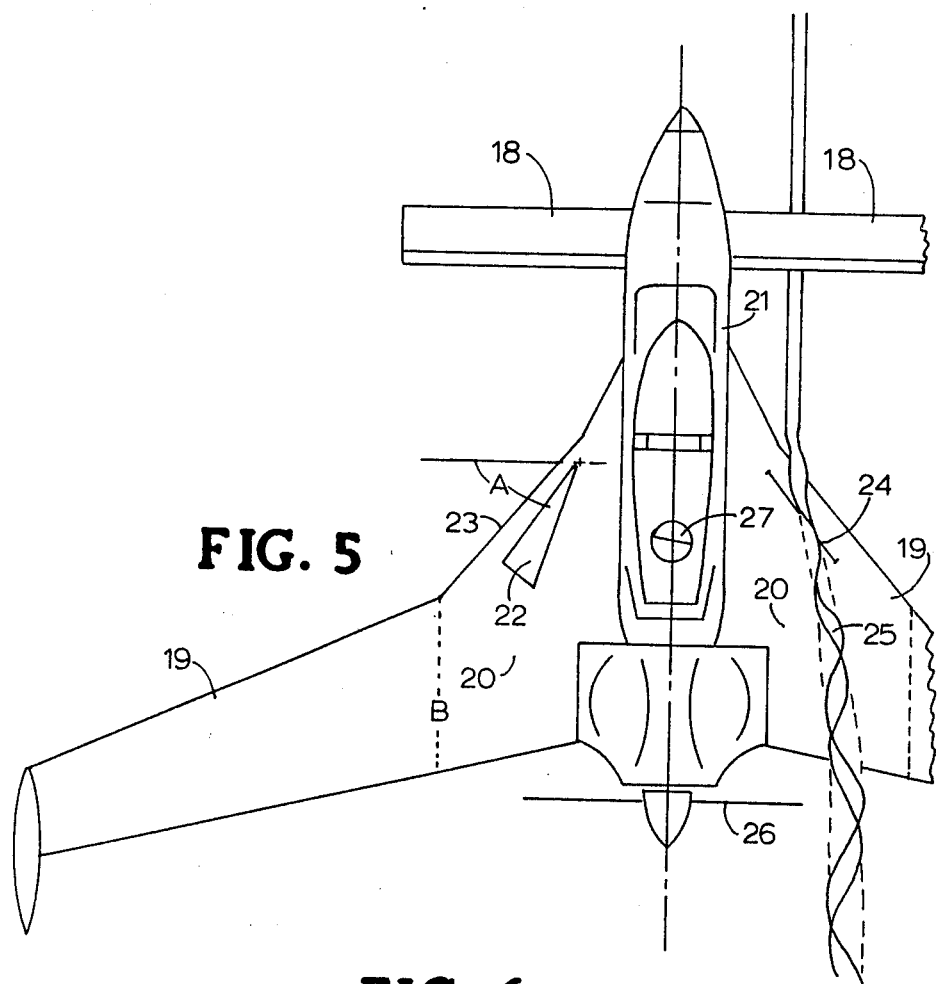
FIG. 5 is a plan view of a canard-type aircraft having the strake fence flap system of the invention.

FIG. 5 is a plan view of the same canard-configured aircraft presented in the previous figures with the strake fence flaps of this invention. This figure clarifies the geometry which is characteristic of canard aircraft with the aforementioned canard 18, rear wings 19, strakes 20, and fuselage 21. Dashed line B indicates the outer bound of strakes 20, which are also bounded by the fuselage 21. Although the strake fence flaps are intended to be deployed together, they are shown in the retracted 22 and extended 24 modes on the left and right strakes, respectively. Notice on the left strake 20 that the flap 22 lies flush with the strake surface and is positioned behind the leading edge 23. The lower hinged edge of the flap is positioned at an angle A with respect to the traverse axis of the aircraft. Ideally, this angle A is between 60 and 80 degrees. Howver, this angle may also ideally be between 100 and 120 degrees, in which case the flap would "point" in the opposite direction, but still have the same angular orientation with respect to the airflow.

The right strake region shows the strake fence flap 24 in a vertically deployed position with a representative vortex 25 trailing back as discussed previously. This illustrates the importance of the ability of this invention to be positioned as required to obtain the maximum benefits while avoiding any detrimental effects. Here, the spanwise position is determined such that the vortex avoids contact with the propeller disk 26. Also note that, once the resultant of the vortex lift force is determined for a particular application, the longitudinal position of the flap must be determined such that it allows this force to act close to the aircraft center of gravity 27 so as to avoid any major changes in longitudinal trim.

Figure 6:
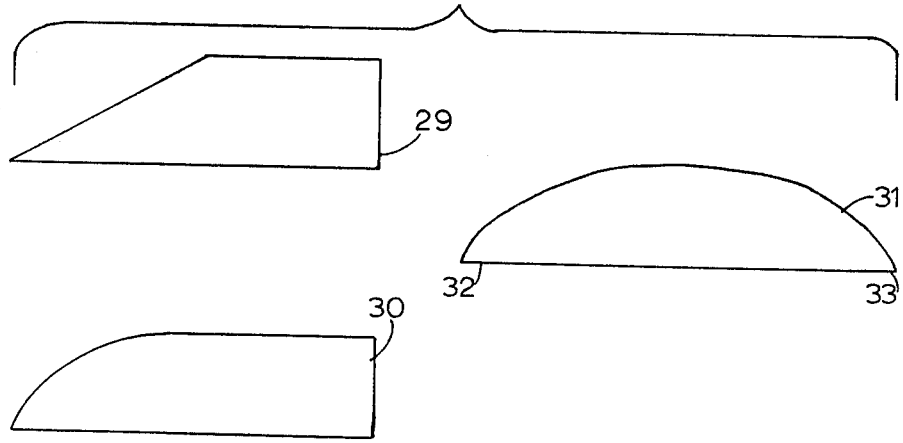
FIG. 6 is a view of different shapes the strake fence flap may have.

The shape of the flap may take several forms, in addition to the delta shape disclosed in the previous drawings. FIG. 6 discloses cropped delta 29, gothic 30 and double gothic 31 shapes which may also be used. However, regardless of the particular shape employed, it is essential that the flap be capable of deflecting airflow upward and into a vortex. This is accomplished by ensuring that the width of the flap increases from the point closest to the traverse axis of the aircraft to a point on the flap further from the traverse axis. However, it is not essential that this width continue to increase until it reaches the opposite end of the flap. In the double gothic shape for example, the width of the flap gradually increases from the first tip 32 closest to the traverse axis to the midpoint, then decreases towards the second tip 33.

We claim:
1. An aircraft strake-flap combination comprising:
an aircraft strake having a top side and a bottom side;
a front and a rear;
a leading edge and a trailing edge; and
a strake fence flap attached to the top side of the aircraft strake; said flap having a lower edge, said lower edge having a first tip and a second tip;
capable of being placed in a first position wherein the flap is flush with the top surface of the strake;
capable of being placed in a deployed position such that the flap extends at an upward angle of deflection relative to said strake;
said first tip being positioned on the strake closer to the front of the strake than said second tip;
said first tip having an acute angle; said first tip being positioned on the strake closer to the centerline of the aircraft than said second tip; and the width of the flap increasing from the first tip to a maximum width with the maximum width occurring rearward of the first tip.

2. The aircraft strake-flap combination of claim 1 wherein:
the flap can be moved to any position between the first and deployed positions.

3. The aircraft strake-flap combination of claim 1 wherein:
the angle between a line perpendicular to the longitudinal centerline of the aircraft and the lower edge of the strake fence flap is 60 to 80 degrees.

4. The aircraft strake-flap combination of claim 1 wherein:
the strake fence flap has a triangular shape.

5. The aircraft strake-flap combination of claim 1 wherein:
the strake fence flap has a cropped delta shape.

6. The aircraft strake-flap combination of claim 1 wherein:
the strake fence flap has a gothic shape.

7. The aircraft strake-flap combination of claim 1 wherein:
the strake fence flap has a double gothic shape.

8. A canard-configured aircraft comprising:
a fuselage;
a forward canard wing
a main wing located behind the forward canard wing having a strake;
said strake having a top side and a bottom side;
a front and a rear;
a leading edge and a trailing edge; and
a strake fence flap attached to the top side of the aircraft strake; said flap having a lower edge, said lower edge having a first tip and a second tip;
capable of being placed in a first position wherein the flap is flush with the top surface of the strake;
capable of being placed in a deployed position such that the flap extends at an upward angle of deflection relative to said strake;
said first tip being positioned on the strake closer to the front of the strake than said second tip;
said first tip having an acute angle; said first tip being positioned on the strake closer to the centerline of the aircraft than said second tip; and the width of the flap increasing from the first tip to a maximum width with the maximum width occurring rearward of the first tip.

9. The canard-configured aircraft of claim 8 wherein:
the flap can be moved to any position between the first and deployed positions.

10. The canard-configured aircraft of claim 8 wherein:
the angle between a line perpendicular to the longitudinal centerline of the aircraft and the lower edge of the strake fence flap is 60 to 80 degrees.

11. The canard-configured aircraft of claim 8 wherein:
the strake fence flap has a triangular shape.

12. The canard-configured aircraft of claim 8 wherein:
the strake fence flap has a cropped delta shape.

13. The canard-configured aircraft of claim 8 wherein:
the strake fence flap has a gothic shape.

14. The canard-configured aircraft of claim 8 wherein:
the strake fence flap has a double gothic shape.

15. The canard-configured aircraft of claim 8 wherein:
the strake fence flap is located forward of the center of gravity of the aircraft.

16. The canard-configured aircraft of claim 8 wherein:
the first tip of the strake fence flap is located forward of the center of gravity of the aircraft and the second tip of the strake fence flap is located aft of the center of the gravity of the aircraft.

17. The canard-configured aircraft of claim 8 wherein:
the strake fence flap is located aft of the center of gravity of the aircraft.

* * * * *